United States Patent [19]

Watson

[11] Patent Number: 4,760,372

[45] Date of Patent: Jul. 26, 1988

[54] BICYCLE INDICATOR SYSTEM

[76] Inventor: Harry D. Watson, P.O. Box 2812, Boise, Id. 83701

[21] Appl. No.: 39,441

[22] Filed: Apr. 17, 1987

[51] Int. Cl.$^4$ ............................. B62J 3/00; B60Q 1/26
[52] U.S. Cl. ...................................... 340/134; 340/67; 340/73; 340/74
[58] Field of Search ................. 340/134, 81 R, 67, 72, 340/73, 74, 81 F, 84; 307/10 LS; 362/72

[56] References Cited

U.S. PATENT DOCUMENTS 3,925,757 12/1975 Kimmelman ...................... 340/81 R
4,099,159 7/1978 Windisch ............................. 340/134
4,204,191 5/1980 Daniels ................................ 340/134

FOREIGN PATENT DOCUMENTS 2055829 5/1972 Fed. Rep. of Germany .
155130 3/1981 Japan .
8202697 7/1982 Netherlands .

Primary Examiner—Donnie L. Crosland
Attorney, Agent, or Firm—Nies, Webner, Kurz & Bergert

[57] ABSTRACT

An indicator or lighting system for bicycles or other vehicles. The indicator system includes a turn signal system, a hazard flash system and a running light system employed in conjunction with a timer and utilizing a convenient battery pack as well as a pair of light and cross bar assemblies. each of the turn signal, hazard flash and running light system employs a double-throw double-pole switch having a pair of movable contacts both ganged together to move in unison from respective neutral positions to either a left hand or right hand position. In one active position, the running light switch initiates steady illumination of the lights to provide a running light system. In the other active position, the running light switch allows activation of the hazard flash or turn signal system.

13 Claims, 3 Drawing Sheets

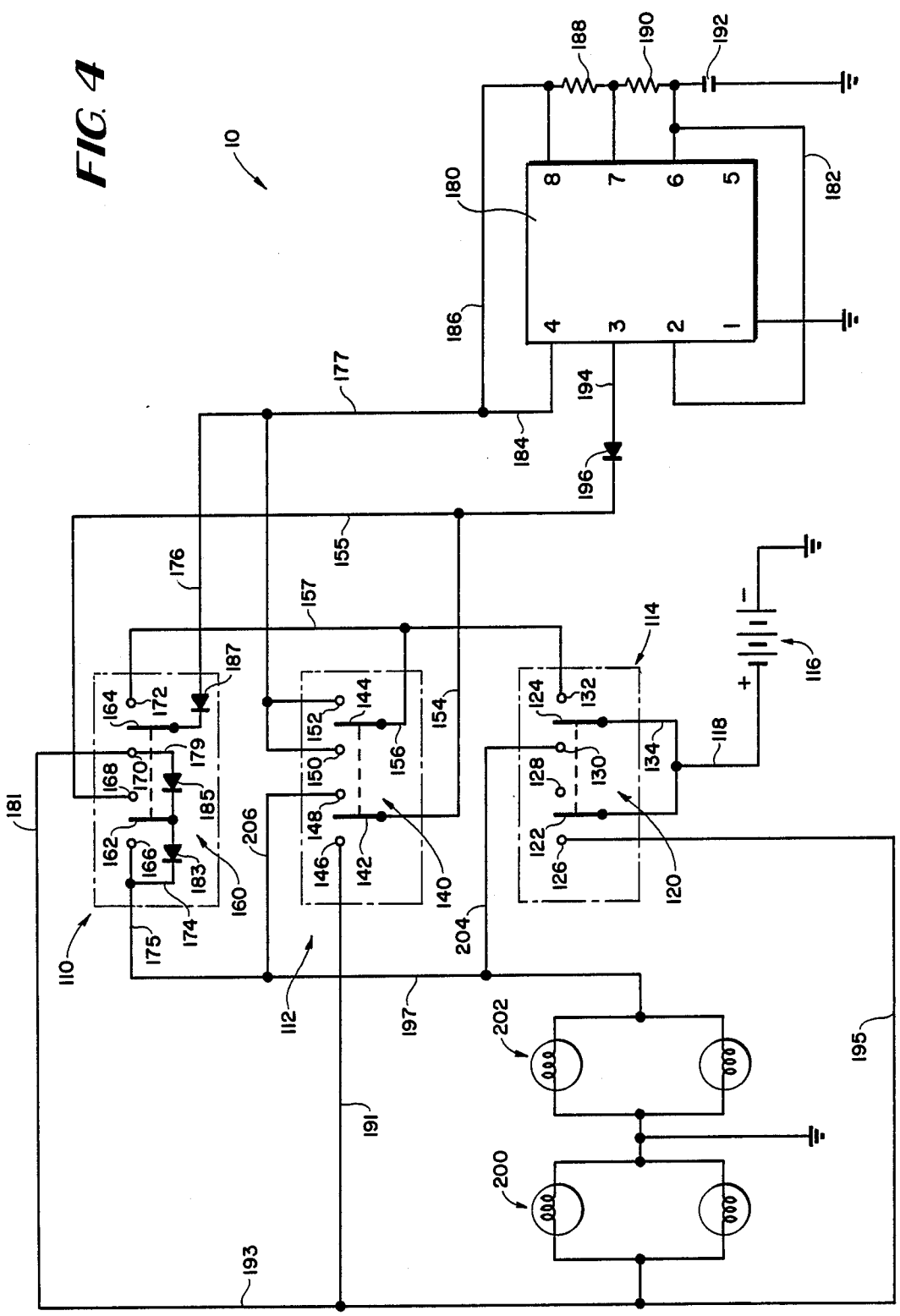

BICYCLE INDICATOR SYSTEM

BACKGROUND AND SUMMARY OF THE INVENTION

The present invention relates to a bicycle indicator system. More particularly, the present invention relates to a lighting system, including a combination flashing turn signal, hazard and running light system for bicycles.

Previous lighting systems for use with bicycles and other vehicles are described, for example, in the following U.S. Pat. Nos.: 4,020,458 to Windisch; 4,204,191 to Daniels; and 4,290,048 to Cutlip et al. Other lighting systems are described in the following patents: West German Pat. No. 2,055,829; Dutch Pat. No. 8,202,697; and Japanese Pat. No. 57-155130.

By the present invention, there is provided an improved bicycle indicator or lighting system which is compact, easy to use and with the various components being located in positions which provide easy access. The present indicator system includes a turn signal system, a hazard flash system and a running light system which are employed in conjunction with a timer and utilizing a convenient battery pack as well as a pair of light and cross bar assemblies. The light and cross bar assemblies provide a sturdy mounting arrangement for the lights, with excellent visibility, while not interfering with normal operation of the bicycle.

BRIEF DESCRIPTION OF THE DRAWINGS

FIG. 4 is a schematic wiring diagram of the electrical circuitry employed by the present apparatus.

DESCRIPTION OF THE PREFERRED EMBODIMENTS

Figure 1:
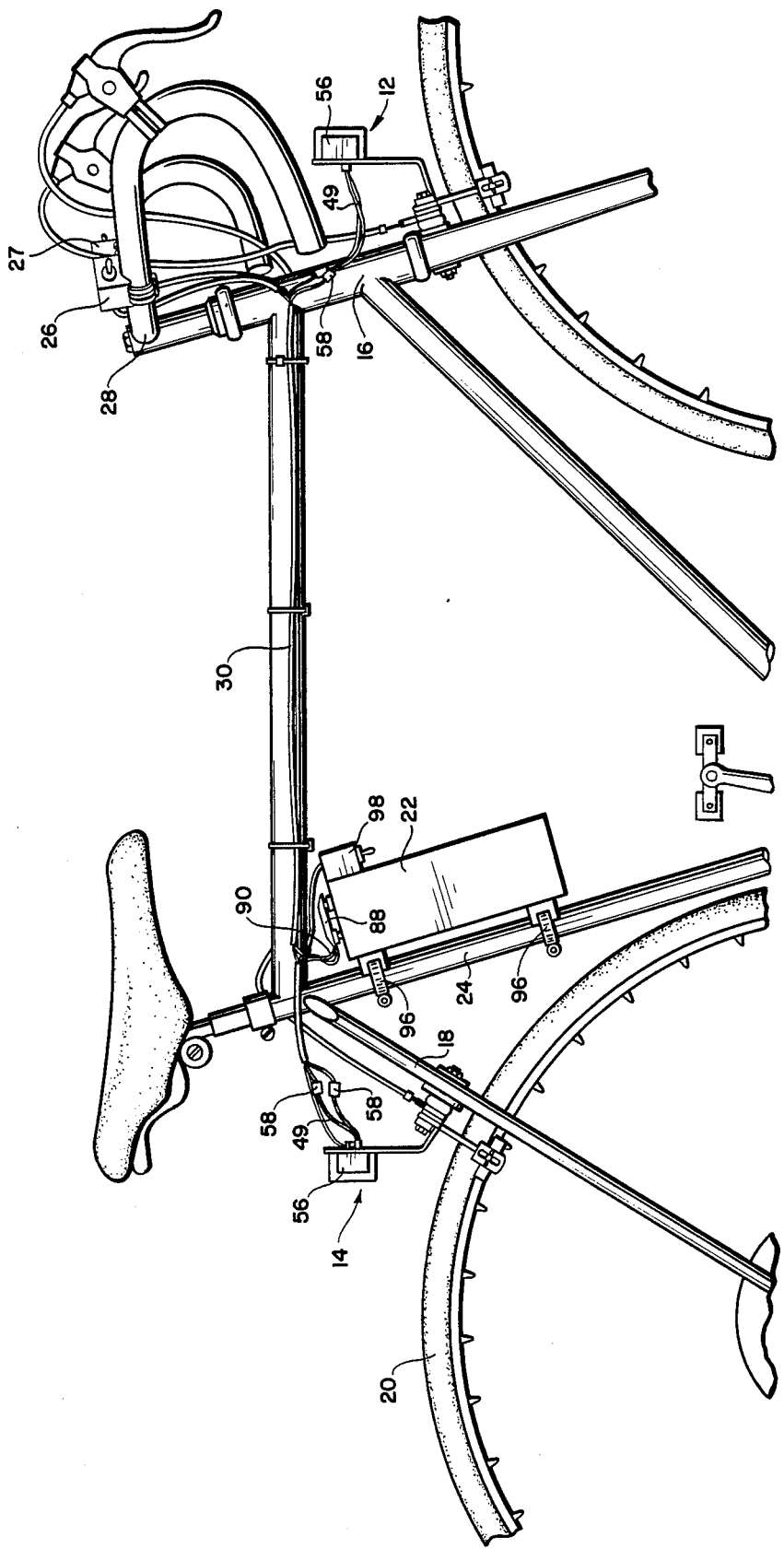
FIG. 1 is a fragmentary view of a bicycle showing a bicycle lighting system embodying the present invention mounted directly on the bicycle.

In the embodiment of the invention as shown in FIGS. 1 through 4, there is provided a bicycle lighting system 10 having a pair of light and cross bar assemblies 12, 14 mounted respectively on the front and rear of the bicycle frame. The forward assembly 12 is secured to the head tube 16 of the bicycle frame while the rear assembly 14 is secured to the seat stays 18 which pass on either side of the rear wheel 20. A battery pack container 22 is mounted on the seat tube 24 of the bicycle by the use of suitable clamps. A pair of directional turn switches 26, 27 is mounted on the handle bars 28 and electrically connected to the other components of the system by suitable electrical wiring 30.

Figure 2:
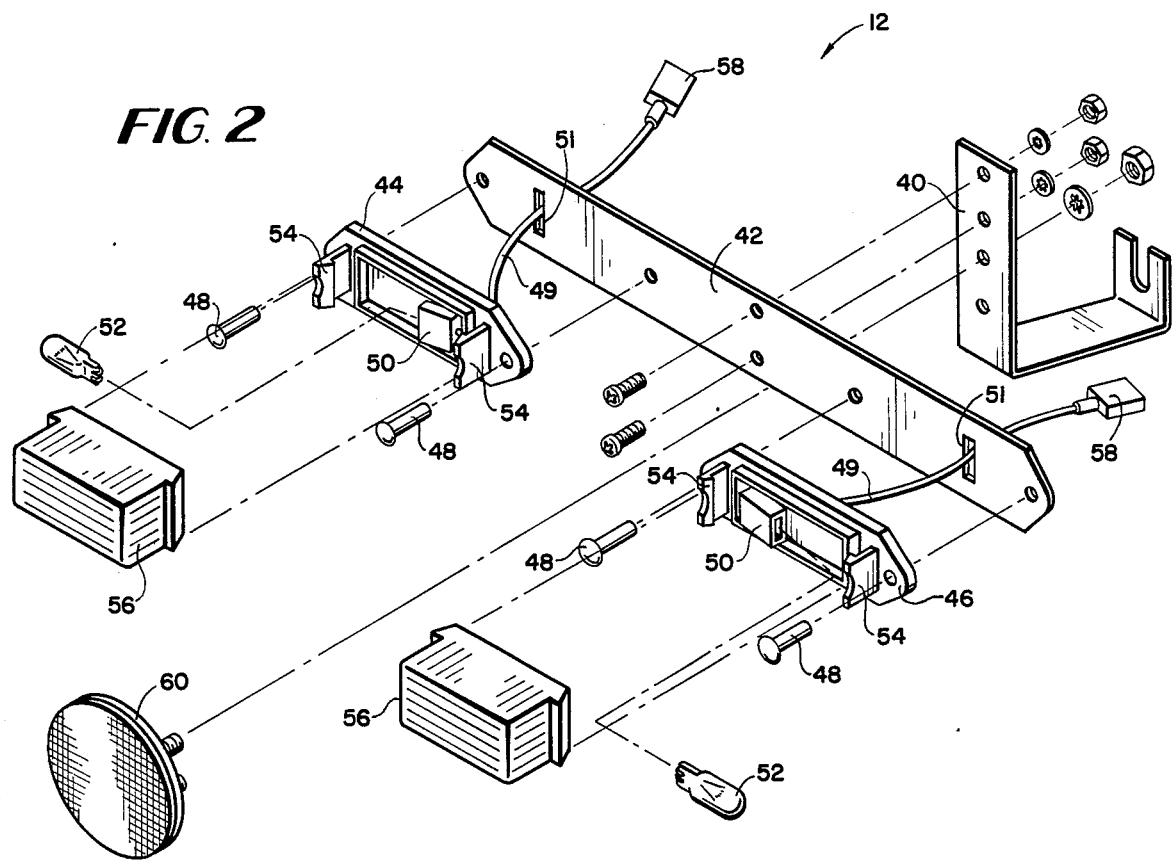
FIG. 2 is an exploded perspective view of a light and cross bar assembly employed in the system of the present invention.

The light and cross bar assembly 12 as shown in FIG. 2 includes a caliper brake bracket 40 having attached a light cross bar 42 with light bases 44, 46 attached at either end of the cross bar 42 by suitable bolt means 48. Each light base 44, 46 is provided with a conventional receptacle 50 for mounting a light bulb 52 and brackets 54 are provided at the ends of the bases 44, 46 for releasably mounting a light lens 56 so as to maintain a water tight seal in conjunction with the respective base 44, 46 around the bulb 52. In one embodiment, the bulbs 52 were GE-285 type bulbs. Each light bulb receptacle 50 is connected by suitable wiring 49 which passes through an opening 51 in the cross bar 42 to a pull-apart wire connector 58 for use in connecting the respective light bulb 52 with the other electrical components of the system 10. A reflector 60 is centrally mounted to the bracket 40 at a position just beneath the midpoint of the length of the cross bar 42. The light and cross bar assemblies 12, 14 are basically identical, with minor variations in the size and angle of the brackets 40 to allow installation of the assemblies 12, 14 in the proper position.

Figure 3:
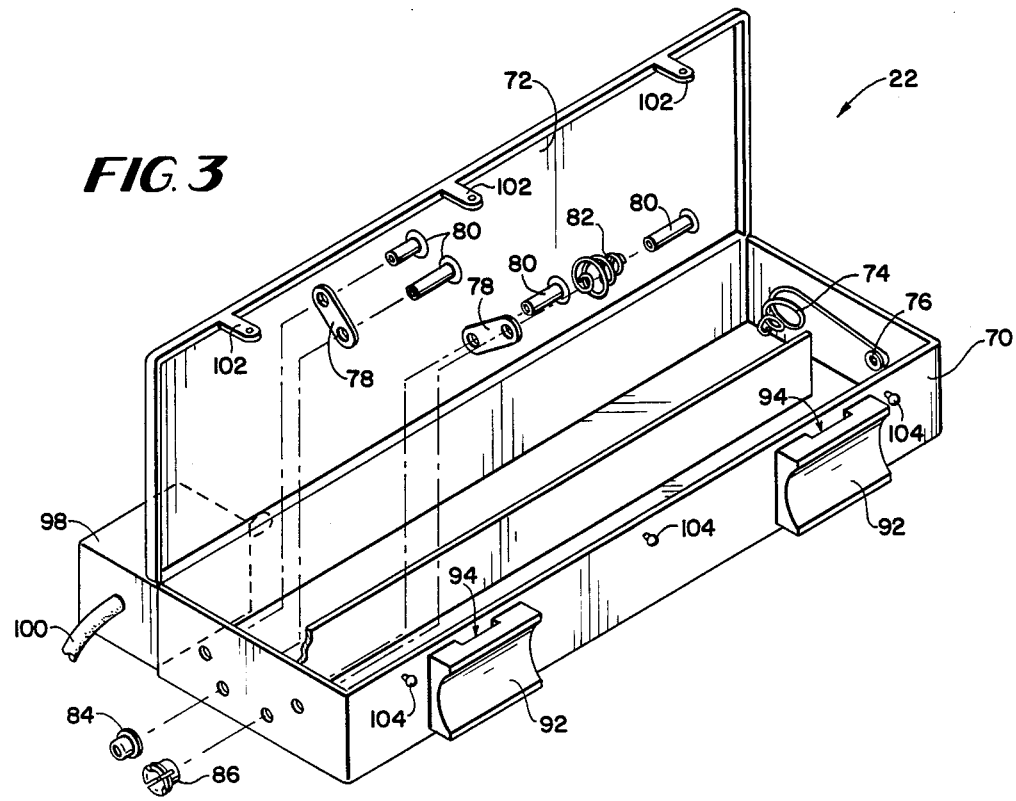
FIG. 3 is a perspective view of a battery case and components employed in the system of the present invention.

The battery pack container 22 as shown in FIG. 3 includes a case 70, of plastic or similar material, with hinged lid 72 for containing the batteries which in one embodiment may be eight dry cell batteries providing a 12 volt system. At one interior end of the case 70, there is provided a spring 74 and rivet 76 connection to the case wall. At the opposite end, a pair of buss bar members 78 are provided, with suitable rivets 80 for securing the buss bars 78 and a spring 82. The inner ends of the buss bars 78 are secured respectively to a male 84 and female 86 connector which extend from the exterior of the case 70. These connectors 84, 86 mate with similar connectors on a strap member 88, shown in FIG. 1, which is connected by suitable wiring 90 to the other electrical components of the system 10. A pair of support brackets 92 are attached to the exterior of the case and have their outer edges concavely curved so as to fit snugly against the seat tube 24 of the frame. An indentation 94 is provided in the interior surface of each bracket 92, extending from top to bottom thereof, for use in receiving a screw clamp 96 or other strap means for securing the battery pack 22 to the frame. A switch 98 is attached to the opposite side of the case 70 from the brackets 92 and connected by suitable wiring 100 to the other electrical components of the system 10. A plurality of closure straps 102 and pins 104 are employed to allow the lid 72 to be releasably fastened to the case 70 after the batteries have been installed.

As shown in FIG. 4, there are provided respective switching assemblies 110, 112 and 114 for the hazard flash system, the turn signal system and the running light system. The positive terminal of the battery 116 is electrically connected by conductor 118 to double-pole double-throw switch 120 of the running light assembly 114. The switch 120 has a first movable contact 122 and a second movable contact 124 both ganged together to move in unison from respective neutral positions in which they are shown to either a left hand position or a right hand position. Such unitary movements may be effected in a conventional manner by a finger operated lever.

In its left hand position, movable contact 122 engages a fixed contact 126 and, in its right hand position, engages a fixed contact 128. Similarly, in its left hand position, movable contact 124 engages fixed contact 130 and, in its right hand position, engages fixed contact 132. As shown, the movable contacts 122, 124 are electrically connected by a conductor 134. The switch 120 for the running light switch assembly 114 is an on-off-on switch. Thus the switch 120 may be manually positioned to either the left or the right and will stay in that position even though the hand of the operator is released until the switch 120 is manually repositioned to the center position.

The switch assembly 112 for the turn signal system includes double-pole double-throw switch 140 having a first movable contact 142 and a second movable contact 144, both ganged together to move in unison from respective neutral positions as shown to either a left hand position or a right hand position. Such unitary movements are effected in a conventional manner as in the case of the running light switch 120 described previously.

In its left hand position, movable contact 142 engages a fixed contact 146 and, in its right hand position, engages a fixed contact 148. Similarly, in its left hand position, movable contact 144 engages fixed contact 150 and, in its right hand position, engages fixed contact 152. As shown, the movable contacts 142, 144 are electrically connected to respective conductors 154 and 156, with conductor 154 being connected to conductor 155 and with conductor 156 being connected to conductor 157. The switch 140 for the turn signal switch assembly 112 is a momentary on-off-momentary on switch. Thus the switch 140 may be manually positioned to either the left or right and, upon being released by the operator, will immediately move to the neutral off position in the center.

The switch assembly 110 for the hazard flash system includes double pole-double throw switch 160 having a first movable contact 162 and a second movable contact 164, both ganged together to move in unison from respective neutral positions as shown to either a left hand position or a right hand position. Such unitary movements are effected in a conventional manner as in the case of the running light switch 120 described previously.

In its left hand position, movable contact 162 engages a fixed contact 166 and, in its right hand position, engages a fixed contact 168. Similarly, in its left hand position, movable contact 164 engages fixed contact 170 and, in its right hand position, engages fixed contact 172. As shown, the movable contacts 162, 164 are electrically connected to respective conductors 174 and 176, with conductor 174 being connected to conductor 175 and with conductor 176 being connected to conductor 177. Movable contact 162 is also connected to conductor 179 which is connected to conductor 181. A pair of one way diodes 183, 185 are connected as shown in FIG. 4 with a diode in line 174 and another in line 179. A one way diode 187 is also connected in line 176 as shown. Fixed contact 172 is connected to fixed contact 132 of the running light assembly 114 through conductor 157. The switch 160 for the hazard flash switch assembly 110 is an on-off-on switch and thus operates in the same manner as switch 120 for the running light assembly 114.

The lighting system 10 includes a timer 180 which initiates the flashing sequence for the system. The timer 180 may be a standard component known in the art as a "555" timer, including a semiconductor chip which is readily available. A numbered terminal 2 of timer 180 is connected by a conductor 182 to a numbered terminal 6 of timer 180. A numbered terminal 4 is connected by a conductor 184 to conductor 177 and also by conductor 186 to a numbered terminal 8 of the timer 180. Numbered terminals 7 and 8 are connected through resistor 188 and numbered terminals 6 and 7 are connected through resistor 190. A numbered terminal 6 is also connected through a capacitor 192 to ground. A numbered terminal 3 is connected by a conductor 194 to a one way diode 196 and then with conductor 155 which is connected to fixed contact 168 of the hazard flash assembly 110. A numbered terminal 1 is connected to ground as shown in FIG. 4. In one embodiment, resistor 188 had a value of 1,000 ohms, resistor 190 had a value of 100,000 ohms and capacitor 192 had a value of 3.3 microfarads.

On the left side of FIG. 4, it is seen that conductor 181 and conductor 191 are joined to conductor 193 which is connected to the signal lamps for the left side 200 and right side 202 as attached respectively to the front and rear of the bicycle. Conductor 193 is also connected to conductor 195 which is connected to fixed contact 126 of the running light assembly 114. The right side signal lamps 202 are connected by conductor 197 to fixed contact 130 through conductor 204, as well as to fixed contact 148 of the turn signal assembly 112 through conductor 206, and to fixed contact 166 of the hazard flash assembly 110 through conductor 175.

In the operation of the lighting system 10 of the present invention, the movement of running light switch 120 to the left hand position causes movable contacts 122 and 124 to make contact with fixed contacts 126 and 130, thus energizing the left lamps 200 and right lamps 202 to provide steady illumination by all four lamps.

If instead of steady illumination as a running light system, it is desired to utilize the lamps 200, 202 for turn signals or as a hazard flasher, then switch 120 should be moved to the right hand position thus contacting fixed contacts 128 and 132. In this configuration, the activation of turn signal switch 140 will cause either lights 200 or lights 202 to flash with power being sent to the timer 180 upon movement of switch 140 to either the left hand or right hand position. The activation of hazard flash switch 160 rather than turn signal switch 140 will also cause power to be transmitted to the timer 180 when switch 160 is moved to the right hand position, thus providing pulsating current for lamps 200 and 202. The hazard flash switch 160 does not operate the lamps in the left hand position.

The use of diode 196 at the timer 180 prevents feedback. Also, the use of diodes 183 and 185 in the hazard flash system 110 prevents feedback since, if the running light switch 120 had been activated in the left hand position and the switch 160 for the hazard flash system was accidentally also activated, current would be sent back to the timer 180 with a potentially harmful result. Diode 187 also prevents feedback since, if the hazard switch 160 were inadvertently placed in the left hand position and turn signal switch 140 then activated, a potentially harmful result could occur as current would be sent back to the timer 180.

The running light switch assembly 114 would be advantageously employed in position 98 attached to the battery container 22 as shown in FIGS. 1 and 3. The turn signal switch assembly 112 and hazard flash assembly 110 would then be employed in positions 26 and 27 as shown in FIG. 1. The timer 180 and necessary circuit board with turn signal switch assembly 112 can be positioned in one switch box 26 with the hazard flash system 110 including the two diodes 183, 185 positioned in the other switch box 27. Epoxy material may be injected into the boxes 26, 27 to assist in providing a shock-proof, weather-proof container. The switch boxes 26, 27, which may be molded of plastic, are preferably concavely curved on the bottom to fit the contour of the handle bars. Also, suitable openings are provided in flanges in the bottom surface of the boxes 26, 27 on each side to receive mounting straps for securing the boxes 26, 27 to the handle bars.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A vehicle indicator system comprising:
   a right turn signalling lamp;
   a left turn signalling lamp;
   means for initiating a steady illumination of both lamps to thus provide a running light mode;
   means for initiating a flashing illumination of either one of said lamps to thus provide a turn signal mode; and
   means for initiating a simultaneous flashing illumination of both lamps to thus provide a hazard flash mode;
   said means for initiating a steady illumination of both lamps including a switch having at least two positions, said switch being placed in a first position to initiate steady illumination of both lamps and with said switch being placed in a second position to allow activation of said turn signal mode or said hazard flash mode.

2. The indicator system of claim 1 wherein said switch is a double-pole double-throw switch.

3. The indicator system of claim 1 wherein said switch is an on-off-on switch.

4. The indicator system of claim 1 further including a right turn signalling lamp and a left turn signalling lamp on both the front and rear of said vehicle.

5. The indicator system of claim 1 wherein said means for initiating a flashing illumination of either one of said lamps includes a momentary on-off-momentary on switch.

6. The indicator system of claim 5 wherein said momentary on-off-momentary on switch has a pair of movable contacts both ganged together to move in unison from respective neutral positions to either a left hand position or a right hand position.

7. The indicator system of claim 5 wherein said momentary on-off-momentary on switch is a double-pole double-throw switch.

8. The indicator system of claim 1 wherein said means for initiating a simultaneous flashing illumination of both lamps includes an on-off-on switch.

9. The indicator system of claim 8 wherein said on-off-on switch is a double-pole double-throw switch.

10. The indicator system of claim 8 wherein said on-off-on switch has a pair of movable contacts both ganged together to move in unison from respective neutral positions to either a left hand position or a right hand position.

11. The indicator system of claim 1 wherein said switch has a pair of movable contacts both ganged together to move in unison from respective neutral positions to either a left hand position or a right hand position.

12. The indicator system of claim 1 wherein said means for initiating a steady illumination of both lamps includes a power source and a timer connectable to said power source by said means for initiating a flashing illumination of either one of said lamps or by said means for initiating a simultaneous flashing illumination of both lamps.

13. The indicator system of claim 12 wherein said means for initiating a simultaneous flashing illumination of both lamps includes one way diode means for preventing feedback to said timer.

* * * * *